Patented July 13, 1937

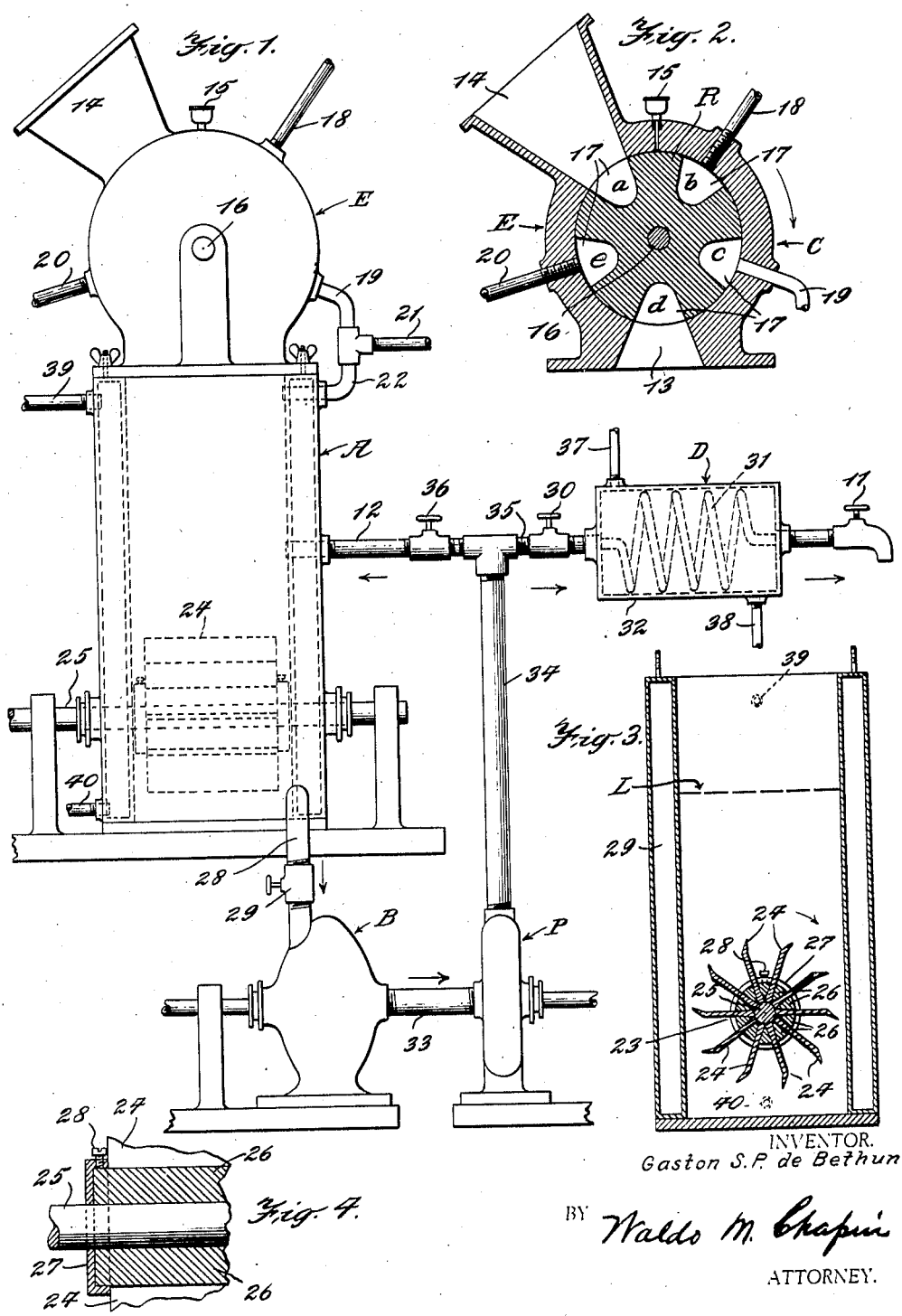

2,086,539

UNITED STATES PATENT OFFICE 2,086,539

METHOD OF AND APPARATUS FOR PRODUCING PASTES OF FOOD AND SIMILAR PRODUCTS

Gaston S. P. de Bethune, New York, N. Y.

Application July 24, 1934, Serial No. 736,653

12 Claims. (Cl. 99—101)

This invention relates to the treatment of raw materials, such as alimentary materials, in bulk, with the general object of effecting their intra-magma thermodisintegration or in short their "thermodisintegration", which expression is used hereinafter as a conveniently brief designation of an improved continuous process comprising the concurrently performed steps of disintegrating the raw uncooked materials while in contact only with a fluid body of their own nature, out of contact with air or any other gas or vapor, and of causing thereby a rapid heat transfer along the newly created boundary surfaces in contact with said fluid body.

Said fluid body which I herein call "magma" is composed of the various constituent elements of said materials intermingled so that the liquid portions of said materials give fluidity to the body, while the solid portions are either dissolved or disintegrated and dispersed in the fluid.

By food products is denoted any edible product which it may be profitable commercially, or otherwise desirable, to produce in a fluid or pasty form, such as puree, jam, marmalade, preserve, spread, cream, dressing, etc., whether the product under any of these or similar forms is marketable if properly canned or packed, without further treatment, or is intended to be subjected to one or more advanced stages of treatment before arriving at its ultimate condition for consumption or storage.

The process is primarily intended for the treatment of fresh materials, such as fruit or vegetables as soon as they are brought in from the orchards or fields, and simply prepared if need be, by removal of any objectionable parts such as twigs, roots, leaves, pits and/or skins; and by washing in order to remove any dirt or other alien substances; also for the treatment of fish, shell fish, fowl and/or meats, as soon as possible after their respective capture and preliminary preparation, such as removal of scales, shells, entrails, bones, sinews, feathers and dirt and other alien substances.

The process may also be utilized advantageously for treating food products after a period of temporary preservation in cold storage, or otherwise treated previously for canning or desiccating. In some instances a certain proportion of the water removed from such materials by dehydration should be restored to them prior to or during the application of the present process.

The latter may also be applied to blendings of two or several food products and it permits moreover a concomitant addition to the food products under treatment of such agents (or a combination of them) as may be required in order to sweeten, to acidify, to season, to flavor, to color, to dilute, to thicken, etc., to the extent that may be necessary or desirable in each instance, and according to principles which will be hereinafter set forth and exemplified.

To operate satisfactorily the herein divulged continuous process, it is essential that there shall be created, when starting the operations, at the intake end of a thermodisintegrating system, and maintained throughout the operations, a reserve of magma under substantially constant conditions of volume, temperature, pressure and fluidity.

An object of the invention is to provide means for creating and maintaining said reserve, under said substantially constant conditions, in order that the concurrent steps of intra-magma disintegration and intra-magma heat-transfer be accomplished continuously within said reserve, the volumetric, thermic and pressure deficiencies produced in said reserve by the ultimate discharge of finished magma being continuously balanced by adequate increments of raw uncooked materials, of heat and of pressure delivered to said reserve, while the condition of fluidity is being maintained by adequate applications of energy at various points of the system.

A further object of the invention is to give to the materials under treatment an adequate temperature under an adequate pressure.

Another object is to carry out the process with a minimum exposure of the materials to air, and to bring them almost instantaneously from their feeding temperature to the temperature prevailing in the system, whereby their natural flavor is preserved to an optimum extent, and with results greatly superior to those effected by conventional methods; also to preserve their vitamins to an optimum degree, while sterilizing the products efficiently.

Still another object of the invention is the provision of apparatus specially designed to facilitate obtaining the desired increase of temperature or a lowering of said temperature, if desired, in a magma of the material under treatment by either one, or by a combination of the following methods, viz: first; by transmitting heat or cold to the materials in progress of treatment by convection from a source of heat, or of cold, such for example as steam or warm water, or cooling fluid in a jacket, and/or in a system of coils: second; by applying friction to the materials under treatment, and raising the temperature thereof by the thermal energy derived from the mechanical energy thus applied: third; in case of the blending of several products simultaneously with their disintegration, the production conductively of a desired heat transfer by feeding one or several of these materials at a higher temperature than the others: fourth; another possible source of heating is an exothermic reaction in the magma of material under treatment.

A further object is to provide means for maintaining an adequate fluidity in the said reserve by continuously returning to it magma in a more advanced stage of treatment.

In carrying the invention into effect the thermodisintegration is preferably continuous, as opposed to the conventional batch work, and the rate of discharge of the final product is equal to the average rate of intake at any given time, the temperature of the discharged product being regulated by the rate of discharge and by the ratio of this latter to the rate of by-passing, when a portion of the material under treatment is returned to an earlier stage for repeated treatment, as is contemplated under certain desirable conditions.

When a fresh fruit or vegetable, or generally any food product treated with adequate fluid is submitted to disintegration, as soon as it or a part thereof comes into effective contact with a disintegrating member, it usually emits juice, which has a tendency immediately to separate from the solid parts and to flow off if circumstances permit its being drained off. I have discovered that the easiest way to prevent this separation is to cause the disintegration to take place within the fluid body hereinbefore called "magma", and to this end, to maintain continuously a reserve of an adequate volume of said magma to cover the disintegration, and to impart to said reserve an adequate turbulence.

Said magma has interesting properties, viz.,— it may be maintained fairly fluid by proportioning the increments of raw materials to the volume of the reserve, and, by keeping it turbulent; it usually "wets" said increments, so that if they have not been fed under vacuum, the air taken by them into the magma readily escapes; finally, the magma insures an intimate contact between all its constituent parts, and thereby fosters heat transfer.

By returning continuously to the intake of the system an adequate proportion of a product already fit, or nearly fit, to be discharged definitely from the system, said returned products are again submitted to the full treatment after having been admixed with the increments of raw materials. A general improvement is noticeable in proportion to the time elapsed, at least for a certain period until a substantially constant regime is obtained, said period being practically coincident with the period required for priming.

The above and other features of the invention are illustrated and described fully in the accompanying drawing and specification and are pointed out in the claims.

In the drawing:—

Fig. 1 is a view in elevation of a form of apparatus for carrying into effect the process herein disclosed.

Fig. 2 is a view in vertical section of the feeding unit of Fig. 1, shown separately.

Fig. 3 is a similar view of the disintegrator unit, also shown separately.

Fig. 4 is a detail view showing the manner of assembly of the knives of the disintegrator.

In the illustrated embodiment of a form of apparatus adapted for carrying the invention into effect, the part designated by the reference character A is a disintegrating unit into which the materials to be treated are fed continuously by a feeding unit E; and after being disintegrated as will be explained, the magma of disintegrated products is passed through a mixing, disintegrating or homogenizing device B, from which it is pumped by a pump P so as to be driven through a system of piping and in part discharged through the discharge D and the valve 11, a part being preferably returned to the intake 12 of the disintegrator A so as to maintain under a constant level L this magma into which the materials to be disintegrated are dropped from the feeding device E through the passage 13. Obviously, the average rate of feed through 13 must be equal to the rate of discharge through the valve 11.

The feeding device E comprises a casing provided with a feed hopper 14 and a rotor R. The rotor R has a general cylindrical or conical shape fitting tightly in the inside of the casing C, being adjusted to rotate inside of this latter. Lubrication is provided by special devices 15 operating with water or any suitable mixture or any suitable oil or fat or emulsion adapted not to impair the taste or flavor of the products under treatment. The rotor has a shaft 16 entering the casing through stuffing boxes (not shown) and is driven by any suitable means (not shown).

The rotor is provided with one or a plurality of sockets or cells 17, five in number being illustrated and described herein, cooperating with the casing to insure the feed of the materials to be disintegrated.

The casing has two openings: one of these is connected with the hopper or chute 14 into which the materials to be treated are continuously delivered at an adequate rate by hand or by any suitable system of conveyors (not shown); the other opening connects the casing through the passage 13 with the upper or feed end of the disintegrator A.

When, due to the rotation of the rotor in the direction of the arrow, a socket or cell 17 such as the one shown in position "a" in Fig. 2, opens in front of 14, this socket is receiving in an adequate way the materials delivered by the chute 14; when, later on, this same socket will be in the position d, these materials will fall through 13 into the feed end of the disintegrator A.

Three systems of pipings, viz.: 18, 19, 20, are connected to the casing. The piping 18 is connected with a system (not shown) permitting the application of suction, so that the socket in position b, after having received its load of materials from 14 in the position a, begins to open in front of 18, the air taken away with same materials is removed, at least to a large extent, and the suction is maintained until the socket is driven to position c, so as to open in front of the piping 19; this latter is connected simultaneously through a pipe 21 with a source (not shown) of a suitable neutral gas such as nitrogen or carbon dioxide or a suitable vapor such as steam or an alcoholic vapor, and the pipe 19 is connected through the pipe 22 with the intake end of the disintegrator A, so that this same socket, now occupying the position c, is at equilibrium of pressure with said intake, this pressure being either smaller or greater than the atmospheric pressure as may be desirable in view of the temperature to be maintained in the intake and in the magma therein. After having dropped the materials through 13, as said hereinbefore, the socket, empty of materials, but filled with the same gas or vapor as the intake, moves on and when it reaches the position e, having opened in front of the pipe 20, it has been put in communication with a system of vacuum (not shown) by which the neutral gas or vapor that fills it can be recovered, or it is simply put in communication with the outside atmosphere, so as to release the pressure.

Finally the socket comes back to its initial position a, and the whole cycle starts again, each socket 17 having in turn been operating in the same cycle.

It can be seen that the sockets 17 can be made as large as materially possible and of any convenient shape; the only limit is due to the fact that the walls separating two adjoining sockets must be thick enough to avoid any short circuiting between the openings and pipings 18, 19 and 20.

The disintegrator A may comprise any suitable system of pulper, shearer, disintegrator, etc. In the instance illustrated, I have shown a rotary type of disintegrator having a barrel 23 equipped with several knives 24, mounted removably in the barrel 23, along radii thereof, being secured in position on the shaft 25 by wedge members 26 and by caps or keepers 27 keyed to the wedge members by set screws 28. This disintegrator when rotating produces a very great turbulence of the magma inside of the intake of the disintegrator, which circumstance is highly favorable to maintain the fluidity of, and to insure a good heat transfer to the magma as will be explained now. The intake end of the disintegrator as well as the body thereof should be jacketed as at 29 and/or a system of coils or a system of radiators (not shown) may be provided inside of the intake or of part of it, in order to permit by heat transfer either to warm up or to cool down the magma in the intake, by circulating a warmer or cooler medium in the jackets, coils or radiators.

One of the objects of this invention is by maintaining the magma in the intake at a suitable temperature to bring as rapidly as possible the materials to the same or nearly the same, temperature, or in other words, to disintegrate the materials with a simultaneous change in temperature of organic products, the newly created boundary surfaces of the disintegrated materials being immediately brought to the temperature of the surrounding magma (or a temperature very near it). When the object is a raise in temperature, it is well known that a sudden raise from say room temperature (70° F.) to between 170 and 200° F. rapidly destroys the enzymes and insures a better conservation of the flavors and probably also of the vitamins.

The machine B may be a mixing, disintegrating or homogenizing machine of any suitable type. I prefer, however, a mixer of the type covered by my U. S. Patent No. 1,727,723 and my pending application for patent, Serial No. 645,363, filed December 2, 1932. This preference is due to the fact that such machines are very effective when some additional materials have to be added to the materials at this stage, such as flavoring or seasoning materials if they have not been admitted with the other materials through the feeding device E. Another reason for this preference, is that such machines act as further disintegrators of increased efficiency, reducing progressively the solid fragments to a very small size, fostering the heat transfer and producing a homogeneous fluid product at adequate temperature and pressure, which product is ready to be delivered to the discharge appliance.

The pump P may be a rotary, centrifugal or piston pump of any suitable type, adapted to each different case.

The disintegrator A is connected to the machine B through the piping 28 on which is provided a valve 29 in order to be able to shut off the flow during the period of priming the disintegrator, i. e. the period of building up the level L and the temperature of the magma, although this priming can also be done by maintaining the circulation through the whole system, only the valve 30 on the discharge being then closed until such priming is finished.

The discharge D comprises another system of heat transfer as for example a system of coils 31 of a certain length contained in a jacketed (or not) enclosure 32. This device is particularly intended for the case in which the materials have been treated at a pressure above the atmospheric pressure in order to raise their temperature well above boiling point without their being brought to a boil. If they were then suddenly released at the atmospheric pressure they would boil, whereas their excess of pressure can be absorbed by frictional engagement within the coils 31 and their temperature be lowered by heat transfer to the cooling medium in the enclosure. The final discharge of the products is either made through a valve 11 or the valve 11 may be connected with another apparatus such as a filling machine (not shown) or for another stage of the process, if any.

The pipe 33 connects B and P; the pipe 34 connects the discharge of the pump with a piping leading on the one side 12 to the intake and on the other side 35 to the discharge D. The valves 29, 30, 36, 11 serve to regulate the flows of the returned parts and of the discharged parts. The pipes 37, 38, 39, 40 constitute connections for admitting into the heat transfer devices the heating or cooling medium. It must be understood that B, P and the several pipings can be jacketed if desirable.

It should be mentioned that in certain cases several parts of the system may be omitted without changing its basic nature, as for example, when treating fruit with sugar in order to produce jams, the feeding device E may be dispensed with, inasmuch as in this case the temperature to be imparted to the magma is well below boiling point of the mixture and it has also been shown experimentally that the air escapes readily from the materials in the intake. For that case the discharge valve 11 can be assembled into the pipe 35. As another example, when no additional mixing is contemplated in B, or when the materials may be disintegrated by A in coarse particles and there is consequently no need for their further being rendered finer in B, this latter can be dispensed with. The discharge device D can usually be dispensed with when the feeding device E is not used.

The following are examples of a few of the many useful treatments capable of accomplishment by utilization of the above process and apparatus:

*Example 1. Treatment of carrots*

The carrots are prepared, i. e. washed to remove dirt, and the leaves and roots are removed, if necessary.

A first batch is warmed up to say boiling point by independent means; to the carrots in this batch there has been added about 25% to 35% of water, preferably at about 200° F. The feeding device E and the discharge D are used. When the first batch is ready, it is put into the hopper of the disintegrator in order to prime the system. The feeding device, the disintegrator, the mixer and the pump are started, the vacuum applied by pipe 19 to the socket in the position b being about 29", the pipe 19 being simultaneously connected as well as the pipe 22 through the pipe 21 to a source of steam (saturated) at between 10 and 25 lb. per square inch gauge pressure.

The steam is put on in the jackets.

Prepared carrots with a desired proportion of fluid are now continuously added through the feeding device E as explained in my previous statement and the puree is circulated until the magma in A attains the level L, its temperature being maintained between 240 and 250° F. From this instant on, the discharge device D is set to work, operating at the same constant rate of discharge as the average rate of intake into the system. The discharging puree passing through the coils of the discharge D is cooled down by a cooling medium to about 212° F. in order to prevent its boiling when finally released from the system.

The discharged puree is immediately put into containers; if these latter have been previously sterilized and if their filling and sealing can be done out of any contact with air, the containers need not be further processed. If not so prepared, they are processed according to the usual routine.

Example 2. Treatment of spinach

The spinach is first prepared, i. e. washed in order to remove the dirt, and the roots and dry leaves, if any, are also removed. The system previously described is operated without the feeding device E and without the discharge device D.

A first batch is warmed up to say 190° F. by independent means; to the spinach in this batch there has been added about 25 to 35% of water, preferably at about 200° F. This batch being ready is put into the intake of the disintegrator and this latter is started, as well as the mixer and the pump are started; also steam is put on in the jackets. The puree produced by the disintegrator is thus circulated and new prepared spinach is added simultaneously with the desired proportion of water, this latter preferably at about 200° F.; no part of the puree is discharged until the level L is obtained in the disintegrator, which by that time is full of a liquid magma containing spinach which is already disintegrated, said magma being at an average temperature of say 200° F., although some parts of the freshly admitted spinach may still be at a lower temperature.

From now on there is continuously discharged as much in weight of finished puree at say 200° F., as the weight of materials which are continuously fed into the intake at a constant rate of delivery, for example by operating a conveyor for the solid materials and a gauged pipe for water. A conveyer delivering 42 pounds of prepared spinach every minute, when 18 pounds of water will be admitted during the same time, will permit the discharge of 60 pounds of puree per minute, or at the rate of 3600 pounds per hour.

The discharged puree is put immediately into containers which are sealed and processed according to the usual routine.

It must be mentioned that the added water can be introduced either into the intake of the disintegrator or into the mixer B. Seasoning can also be introduced into the puree in process of thermodisintegration by being continuously introduced into the hopper of the disintegrator A or into the mixer B at a convenient rate of flow.

Steam can be used for warming up either the magma in the intake or the puree in the mixer, by releasing by condensation its latent heat of vaporization, said steam being injected under adequate thermodynamic conditions. When it is injected into the magma, a part of it escapes uncondensed from the upper surface of the magma and protects this latter against contact with air; said steam also is fostering and activating the escape of air admitted with the fresh spinach delivered to the intake of the disintegrator. A remarkable fact is that this latter is immediately wetted by the magma whereby the air taken in is displaced and escapes.

When steam is used, the amount of water to be introduced must accordingly be reduced.

Example 3. Making plum jam

The plums are prepared, i. e. washed and pitted. The system is operated without the special feeding device E and without the discharge device D.

A first batch of prepared fruit is put into the disintegrator and this latter is started as well as the mixer and the pump with steam in the jackets. The plums are very easily transformed by the disintegrator into a puree which is circulated and takes up heat; when the temperature of say about 195° F. is obtained, sugar is added progressively to the puree and circulated with it, whereby it gets mixed with it, until the right proportion of say 45% plums and 55% sugar is obtained, the blending being maintained at the same temperature. From now on, plums and sugar are added in the above proportions and the blending is circulated until the magma in the unit A attains the level L, care being taken to maintain it at the same average temperature. From this instant the discharge is started and maintained at the same rate as the average inflow of materials, the temperature being kept constant by controlling the jackets and/or the rate of returned product through the pipe 12.

The discharged jam is sent to a filling machine and if the containers are satisfactory from the sterility point of view, and if due precautions are taken during the filling and the sealing, they can be kept without any further processing. The containers are cooled down, slowly if in glass, rapidly if in tin cans, the jam usually setting during the cooling.

The above proportion of 45% fruit, 55% sugar may have to change according to the pectin content and the acidity of the plums.

It is to be understood that these examples are not limitative and that the method can be applied and the equipment used for any vegetable or animal edible product or any organic or non-organic product which it would be desirable to treat by thermodisintegration. As objects of such treatment, I wish to mention: thermodisintegrated fruit for the production of cordials or perfumes, thermodisintegrated sugar beets for the extraction of sugar, thermodisintegrated flowers for the production of perfumes or extraction of essences.

As further examples of thermodisintegrated food products, showing further applications of the process of thermodisintegration, I mention:

*Oyster preserves.*—The fresh oyster is thermodisintegrated either alone or with seasoning at a temperature between 170 and 250° F.; the product is put into cans or jars and further processed if necessary. By adding to the thermodisintegrated puree of oysters a few whole oysters which can be done by putting these latter in the containers previous to filling them with the thermodisintegrated puree, a new very tasty product can be obtained.

*Asparagus preserves.*—The tips of the asparagus being put aside, the butts are thermodisintegrated; a proportion of the tips is put into the containers, cans or jars, into which the hot thermodisintegrated product obtained with butts is afterwards introduced. The containers are processed if necessary.

*Cherry jam.*—A part of the pitted or unpitted cherries is put aside and the other cherries preferably pitted are thermodisintegrated with a certain proportion of sugar and, if necessary, of an organic acid. The whole cherries are put at a certain right proportion into the containers, cans or jars into which afterwards the hot thermodisintegrated and sugared cherries are admitted. The containers are then processed to the right temperature if necessary. The sugar proportion in the thermodisintegrated product should be such as to permit a right concentration for gelling of the syrup after osmosis with the whole cherries.

*Pea soup.*—Peas are thermodisintegrated and are put into containers in which previously had been put, in an adequate proportion chunks of pork meat. The containers after being sealed are sterilized if necessary.

*Tomato preserves.*—Chunks of tomatoes or whole tomatoes are put into containers which are filled with thermodisintegrated tomatoes, sealed and sterilized if necessary.

As far as food products are concerned, it is remarkable that the products obtained by thermodisintegration or with application of thermodisintegration show qualities not obtained by other methods. It is a fact that the flavors of the products are much nearer the natural flavors than with other methods and the vitamin contents may be less affected by heat than usually, which is probably a consequence of the heat treatment being applied in the absence of air and in a short time.

The method of thermodisintegration of products under pressure below or above atmospheric may also be applied to chemical processes.

From the foregoing disclosure, it will be seen that my improved process of thermodisintegration comprises the building up in an enclosure of a magma of material to a predetermined level, and disintegrating said magma together with the progressively added increments and the concurrent building up of a predetermined temperature level in the magma, by imparting heat to the materials either by convection, by friction or by conduction, or otherwise or subtracting heat from said materials; also the maintenance of these two levels and an adequate pressure level constant during the continuous operation of the system; also that in some cases it is desirable to by-pass at least a portion of the partially or wholly treated material to an earlier stage for re-mingling with the magma and/or added materials for retreatment and to add to or diminish the heat thereof and thereby aid to control said levels. Thus there is maintained at all times an equilibrium or balance between, on the one hand, the added materials admitted or fed for treatment by way of thermodisintegration, and, on the other hand, the thermodisintegrated materials withdrawn from the magma, the source or sources of heat energy supplying continuously the increment of heat or of cold required to bring the inflowing added materials from their cooler initial temperature to the optimum temperature desirable for the final product upon its discharge.

The by-passing operation is primarily for the purpose of aiding under certain conditions in the maintenance of the same fluidity and temperature throughout the magma of the material under treatment.

Accordingly, the aforesaid process is claimed generically, regardless of the specific apparatus herein disclosed and claimed for carrying it into effect, and regardless of such modifications as may be made, either in the mode of, or apparatus for, practising the process, so far as such modifications do not depart from the spirit of the invention.

I claim:—

1. The process of treating raw alimentary materials in bulk by intra-magma thermodisintegration, said process comprising the operations, performed concurrently, of disintegrating said raw materials out of contact with air or any other gas or any vapor, and in a reserve of a fluid mix thereof, creating extensive circulating currents throughout the magma thus formed, rapidly changing the temperature of the incoming increments by convection between the magma and an external thermal source, and by intra-magma conduction out of contact with air or any other gas or any vapor, to a degree adequate to insure preservation of the product when maintained under adequate thermic conditions, and discharging continuously fluid portions of said reserve equal to the average increments of raw materials fed thereinto.

2. The process of treating raw alimentary materials in bulk by intra-magma thermodisintegration, said process comprising the operations, carried on concurrently and continuously, of disintegrating said raw materials out of contact with air or any other gas or any vapor in a reserve of a liquid magma thereof, creating extensive circulation currents throughout said magma, increasing the temperature of the incoming increments by convection between the magma and an external thermal source and by intra-magma conduction out of contact with air or any other gas or any vapor to a degree adequate to insure preservation of the product when maintained under sterile conditions, and discharging continuously fluid portions of said reserve equal to the average increments of raw materials fed thereinto.

3. The process of treating raw alimentary uncooked materials in bulk by intra-magma thermodisintegration, said process comprising the operations, carried on continuously, of maintaining in an enclosure a fluid magma of constant level substantially filling the enclosure by adding thereto measured increments of raw materials and of fluid medium and withdrawing quantities of the treated product corresponding to the increments of raw materials, continuously disintegrating in said inclosure said raw uncooked materials intra-magma out of contact with air or any other gas or vapor, continuously supplying said fluid magma with adequate increments of heat from an exterior source, and thereby controlling in said magma a degree of temperature adequate to raise the heat of said increments by the intra-magma conduction rapidly from the feeding heat to an optimum heat condition suitable to effect preservation of the final product after discharge thereof into sterile containers.

4. The process of treating raw alimentary uncooked materials in bulk by intra-magma thermodisintegration, said process comprising the operations, carried on continuously, of maintaining in an enclosure a fluid magma of substantially constant volume by adding thereto measured increments of raw materials and of fluid medium and withdrawing quantities of the treated product corresponding to said increments, simultaneously disintegrating in said enclosure said raw uncooked materials intra-magma out of contact with air or any other gas or vapor, supplying said fluid magma with adequate increments of heat from an exterior source, by-passing portions of at least the partially treated materials from one stage of the system to an earlier stage for retreatment and thereby aiding to control in said magma a condition of fluidity and a degree of temperature adequate to raise the heat of said increments by the intra-magma conduction rapidly from the feeding heat to an optimum heat condition suitable to effect preservation of the final product after discharge thereof into sterile containers.

5. The method of disintegrating materials of the class described in the form of a fluid magma, said method comprising the operation of building up a reserve of said magma to a predetermined volume and maintaining continuously said volume by adding measured increments of raw materials, and concurrently withdrawing corresponding quantities of the treated product, applying a rotary disintegrating force at a relatively low region of said magma in such a manner as to perform the disintegration out of contact with air or any other gas or vapor, and to create currents in said reserve, one biased into the region of action of said rotary force, and another biased upward through said fluid magma toward the region of introduction of said added materials, whereby the added materials are quickly brought to the desired condition of fluidity and whereby a constant flow of properly conditioned materials to said disintegrating force is maintained.

6. The process of thermodisintegration comprising the steps of (1) building up a reserve of at least partially thermodisintegrated products in the form of a fluid magma, and maintaining said reserve under substantially constant conditions of volume, temperature, pressure and fluidity, (2) continuously discharging adequate portions of said reserve, (3) continuously making up the volumetric and thermic deficiencies thus created in said reserve by feeding into it adequate quantities of raw materials and by exchanging heat between it and exterior sources of energy, and (4) continuously disintegrating said raw materials intra-magma out of contact with any gas or vapor, thereby causing a rapid intra-magma heat exchange and an equalization of temperature within said reserve.

7. The continuous process of intra-magma thermodisintegrating alimentary materials in bulk, comprising the initial step of building up at the intake end of a thermodisintegrating system a reserve of a liquid magma of said materials, said reserve being characterized by its volume, temperature, pressure, and fluidity, and being maintained in a state of turbulent motion and, while maintaining said reserve under substantially constant and predetermined conditions of volume, temperature, pressure, fluidity and turbulence, the further steps of, pari passu, (1) continuously feeding into said reserve increments of raw materials at an adequate rate of feed, and imparting heat to said magma by convection from an exterior source at an adequate rate of heat transfer, (2) continuously disintegrating said raw materials, said operation being performed intra-magma out of contact with air or any other gas or any vapor, thereby imparting turbulence to said magma and to the enclosed materials in process of disintegration, maintaining fluidity in the reserve, and causing a rapid intra-magma heat conduction and an equalization of temperature, (3) continuously withdrawing from said reserve portions of said liquid magma at a rate superior to the rate of feed, and advancing said portions in two streams, one stream being directed to the discharge of the system at a rate of discharge equal to the rate of feed, and the other stream being returned to said reserve, whereby the liquidity of the magma contained therein is fostered.

8. The continuous process of intra-magma thermodisintegrating alimentary materials in bulk, comprising the initial step of building up at the intake end of a thermodisintegrating system a reserve of a liquid magma of said materials, said reserve being characterized by its volume, temperature, pressure and fluidity, and being maintained in a state of turbulent motion, and, while maintaining said reserve under substantially constant conditions of volume, temperature, pressure, fluidity, and turbulence, the further steps of, pari passu, (1) continuously feeding into said reserve increments of raw materials at an adequate rate of feed, and imparting heat to said magma by convection from an exterior source at an adequate rate of heat transfer, (2) continuously disintegrating in a first disintegrator said raw materials, said operation being performed intra-magma and out of contact with air or with any other gas or vapor, thereby imparting turbulence to said magma and to the enclosed materials in process of disintegration, maintaining fluidity in the reserve, and causing a rapid intra-magma heat conduction and an equalization of temperature, (3) continuously withdrawing from said reserve portions of said liquid magma at a rate superior to the rate of feed, and submitting said portions, in a second and more effective disintegrator, to another and more effective action of intra-magma disintegration, thereby causing a further intra-magma heat conduction and a further equalization of temperature, and a homogenization of said portions, (4) continuously advancing said portions in two streams, one stream being directed to the discharge of the system at a rate of discharge equal to the rate of feed, and the other stream being returned to said reserve, whereby the liquidity of the magma contained therein is fostered.

9. In the process of intra-magma thermodisintegration of materials of the class described, the steps of making and building up to a gravitational level in an enclosure a reserve of liquid magma of the materials, imparting to the magma a predetermined temperature level, and subjecting said magma to a predetermined pressure level, and maintaining constant said gravitational, temperature, and pressure levels, while continuously feeding into said reserve increments of raw uncooked materials, continuously disintegrating said materials, out of contact with air or any other gas or vapor and continuously withdrawing from said reserve fluid portions equal to the average of the incoming increments, submitting said withdrawn portions to a further and more effective operation of intra-magma disintegration at predetermined temperature and pressure levels, returning as an increment to the said reserve a part of said portions and discharging the balance at an adequate temperature for further utilization.

10. The combination in a machine for treating material of the class described, of a unit having a treating chamber with an inlet port, and a feeding unit having a casing with a discharge port in communication with said inlet port of the treating chamber, said feeding unit casing having also a material-feeding port, a suction port, a fluid-charging port, an evacuation port, and a central cavity fitted with a rotor having a cell adapted to be brought successively into registry with said ports by rotation of said rotor, substantially as and for the purpose described, means connecting the treating chamber with the fluid charging port, whereby an equalization of pressure therebetween may be obtained.

11. A rotary feeding device for materials of the class described, said device comprising a rotor having a series of peripheral cells, and a casing having a cavity within which said rotor is fitted, said casing having a material-feeding port, a fluid pressure supply port, a discharge port and an evacuation port, said ports being adapted to register seriatim with each of said cells in turn, substantially as and for the purpose set forth.

12. In a system for continuous intra-magma thermodisintegration of materials of the class described, an intra-magma thermodisintegrating unit of the autoclave type in which said material may be disintegrated intra-magma under pressure at a temperature above the normal boiling point without boiling, and in combination therewith a feeding device having means adapted to withdraw suctionally entrained air from the incoming raw uncooked materials and a discharge device having means adapted to lower the temperature of the final product for delivery thereof in sterile condition for further utilization without boiling.

GASTON S. P. DE BETHUNE.